United States Patent Office  3,021,328
Patented Feb. 13, 1962

3,021,328
3-CYANO-1,2,4-TRIAZINES AND THEIR PREPARATION
Lucille Theresa Morin and Ken Matsuda, both of Stamford, Conn., assignors to American Cyanamid Company, New York, N.Y., a corporation of Maine
No Drawing. Filed May 6, 1960, Ser. No. 27,283
3 Claims. (Cl. 260—248)

This invention relates to novel and useful asymmetrical triazine compounds and to novel methods for their preparation. More particularly, it relates to certain cyano-asymmetrical-triazine derivatives prepared from a novel intermediate, 1-cyanoformimidic acid hydrazide.

The compound of the present invention may be represented by the formula:

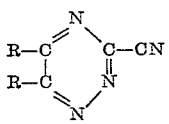

in which each R is either a lower alkyl radical, such as methyl, ethyl, isopropyl, n-butyl, or an aryl radical, such as phenyl or naphthyl.

The compounds of the present invention find utility as pesticides. They are particularly valuable as herbicides.

In general, the novel method of preparation of said asymmetrical triazine derivatives involves the reaction between an α-dicarbonyl compound and 1-cyanoformimidic acid hydrazide. The over-all reaction may be represented in the following manner:

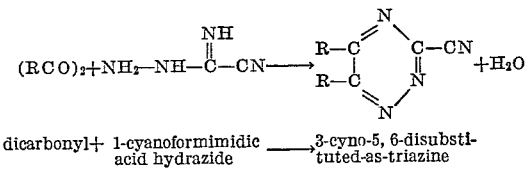

dicarbonyl + 1-cyanoformimidic acid hydrazide → 3-cyno-5, 6-disubstituted-as-triazine in which R is either lower alkyl or aryl as defined above.

Illustrative dicarbonyl compounds within the purview of the present invention are: diacetyl, dipropionyl, disobutyryl, benzil, and dinaphthyl diketone.

The 1-cyanoformimidic acid hydrazide reactant may be prepared by causing equimolar amounts of cyanogen and hydrazine to react. A specific mode of preparation is set forth more fully below.

Though the process of the invention will be illustrated hereinafter by reacting essentially equimolar quantities of a dicarbonyl and the 1-cyanoformimidic acid hydrazide, an excess of either reactant can be tolerated. However, to insure complete reaction it is a preferred practice to cause the reaction to occur in the presence of a slight mol excess of the dicarbonyl compound with respect to the hydrazide reactant.

Advantageously, the over-all reaction can be conducted over a relatively wide range of temperatures from 0° C. to 200° C. and preferably from 50° C. to 150° C. In most instances the reaction can be completed within three to five hours or even less.

The cyano-asymmetrical triazines as prepared above can be conveniently incorporated into inert carriers and utilized particularly in herbicidal compositions. Relatively small amounts, usually in the range of from 1% to 10%, of the active compound are sufficient to effect the desired useful result. Any commercially available carrier in a liquid, solid or gaseous form can be employed. Such carriers are for instance solids and liquids such as talc, clay, diatomaceous earth, non-solvents, such as petroleum hydrocarbons, as well as organic propellants, such as halogenated and unhalogenated hydrocarbons, as for instance, dichloro difluoromethane, propane, isobutane, and mixtures thereof.

The following examples are presented to more fully illustrate the invention and are not to be taken as limitative thereof. Unless otherwise noted, the parts are by weight.

*Example A*

To a stirred solution of 156 parts of cyanogen in 1000 parts of dioxane are added at a temperature of from about 3° C. to 10° C. over a period of two and a half hours, a solution of 96 parts of hydrazine in 330 parts of dioxane-methyl alcohol mixture. The latter alcohol dioxane mixture is in a proportion of 1 to 10, respectively. After about one half hour, crystallization starts and the solution gradually turns orange color. After hydrazine addition is completed, active agitation is continued for an additional half hour at about 5° C. 208.3 parts of 1-cyanoformimidic acid hydrazide are collected by filtration. The product melts at 73–77° C. When recrystallized from ethylene dichloride, yellow plates melting at 83–86° C. are obtained, analyzing in percent as follows.

Calculated: C, 28.57; H, 4.80; N, 66.64; M.W. 84.0.
Found: C, 29.26; H, 4.97; N, 65.73; M.W. 86.5.

*Example 1*

To a suitable reaction vessel containing 43 parts of diacetyl (0.50 mol) in 300 parts of absolute alcohol are added 42 parts of 1-cyanoformimidic acid hydrazide (0.50 mol) as prepared in Example A above and 0.01 part of glacial acetic acid. The reaction mixture is then heated under steam at 78° C. for two and a half hours. Evaporation of the solvent employed vacuum distillation yields 79% of an oil which solidifies on cooling. Recrystallization from ether yields a yellow solid melting at 41–43° C. and is identified as 3-cyano-5,6-dimethyl-as-triazine, analyzing (in percent) as follows.

Analysis ($C_6H_6N_4$): Calculated, C, 53.72; H, 4.51; N, 41.77; M.W. 134.1.  Found, C, 53.81; H, 4.64; N, 42.06; M.W. 128.8.

*Example 2*

A solution of 21 parts of benzil (0.10 mol), 8.4 parts of 1-cyanoformimidic acid hydrazide (0.10 mol) as prepared in Example A above and 0.01 part of glacial acetic acid in 600 parts of benzene are refluxed for forty-one hours. The reaction is terminated when approximately 50% of the theoretical amount of water (2.0 parts) had been collected. The solvent is next evaporated. A residue, 3-cyano-5,6-diphenyl-as-triazine is obtained as a yellow solid. The latter is next washed with ether and recrystallized from isopropyl alcohol, a 39% yield of a yellow solid of melting point 154–155° C. having the following analysis in percent.

Analysis ($C_{16}H_{10}N_4$): Calculated, C, 74.40; H, 3.90; N, 21.69; M.W. 258.3.  Found, C, 74.63; H, 3.86; N, 21.90; M.W. 256.1.

*Example 3*

The foregoing illustrative compounds are subjected to the following tests to determine their potency as herbicides.

Approximately 50 radish seeds and 50 wheat seeds are each placed in separate bottles, together with 25 cc. of active compound in a 0.1% water suspension. The bottles containing the active chemical compound and seeds are clamped in place on a tumbler where they are rotated for twenty hours. The seeds are then removed from the bottles. Any excess and unfixed test compound is washed free from the seeds. The washed seeds are placed on moist blotters in a high humidity cabinet and there held for a five-day period to effect germination. Approximately 95% seed mortality is recorded for each batch thus-treated with the compound prepared in accordance with Examples 1 and 2, above.

We claim:
1. The cyano-asymmetrical triazine having the structure:

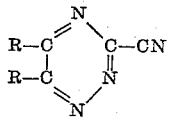

wherein each R is a radical selected from the group consisting of a lower alkyl, phenyl and naphthyl.

2. 3-cyano-5,6-dimethyl-as-triazine.
3. 3-cyano-5,6-diphenyl-as-triazine.

References Cited in the file of this patent

Bamberger et al.: Ber. d. Deutsch. Chem. Ges., vol. 26 (part III), pages 2385 to 2391 (1893).

Chemical Abstracts, vol. 41, columns 4985–88 (1937).

Migrdichion: The Chemistry of Organic Cyanogen Compounds, ASC, Monograph Series No. 105, page 73, Reinhold Pub. Corp., N.Y. (1947).

Erickson et al.: The 1,2,3- and 1,2,4-Triazines, Tetrazines and Pentazines, pages 48 to 49, 56, 59 and 61, Interscience Pub. Inc., N.Y. (1956).